United States Patent
Takahashi et al.

(10) Patent No.: US 7,237,110 B2
(45) Date of Patent: Jun. 26, 2007

(54) AUTHENTICATION SYSTEM, AUTHENTICATION APPARATUS, AUTHENTICATION TARGET APPARATUS, AUTHENTICATION METHOD, METHOD OF BEING AUTHENTICATED, PROGRAM AND INFORMATION RECORDING MEDIUM

(75) Inventors: Fujinobu Takahashi, Tokyo (JP); Ken Umeno, Tokyo (JP); Tetsuro Kondo, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 733 days.

(21) Appl. No.: 10/349,558

(22) Filed: Jan. 22, 2003

(65) Prior Publication Data
US 2003/0145202 A1    Jul. 31, 2003

(30) Foreign Application Priority Data
Jan. 28, 2002    (JP)    ............................. 2002-018810

(51) Int. Cl.
*H04L 29/00* (2006.01)
(52) U.S. Cl. ...................... 713/168; 380/258; 380/259; 380/260
(58) Field of Classification Search ................ 726/2–4, 726/17, 21, 27, 30; 713/161, 170, 168; 380/258–260, 380/30; 455/435.2, 13.1, 13.2, 13.3
See application file for complete search history.

(56) References Cited

U.S. PATENT DOCUMENTS

| | | | | |
|---|---|---|---|---|
| 4,170,776 A | * | 10/1979 | Frosch et al. | ................ 342/458 |
| 4,463,357 A | * | 7/1984 | MacDoran | ................... 342/460 |
| 4,797,677 A | * | 1/1989 | MacDoran et al. | ......... 342/352 |
| 6,963,973 B2 | * | 11/2005 | Chapman et al. | ........... 713/168 |
| 7,003,113 B1 | * | 2/2006 | Yanase | ........................ 380/258 |

\* cited by examiner

*Primary Examiner*—Kambiz Zand
*Assistant Examiner*—Tongoc Tran
(74) *Attorney, Agent, or Firm*—Mitchell P. Brook; Luce, Forward, Hamilton & Scripps LLP (57) ABSTRACT

An observation unit of an authentication apparatus and an observation unit of an authentication target apparatus observe a radio wave from a common radio star at a common observation time. A sending unit sends information message including information on the observed radio wave, and an information reception unit receives it. An estimation unit estimates a position of the authentication target apparatus based on "the information on the radio wave observed by the observation unit" and "information on the radio wave observed by the observation unit". A retaining unit pre-retains positions of one or more authentication target apparatus(s). A determination unit checks whether a position of the authentication target apparatus pre-retained in the retaining unit and the estimated position correspond within a predetermined error range, and settles authentication for the information message as a success in a case where the positions correspond.

24 Claims, 5 Drawing Sheets

AUTHENTICATION SYSTEM, AUTHENTICATION APPARATUS, AUTHENTICATION TARGET APPARATUS, AUTHENTICATION METHOD, METHOD OF BEING AUTHENTICATED, PROGRAM AND INFORMATION RECORDING MEDIUM

BACKGROUND OF THE INVENTION

1. Field of the Invention

The present invention relates to an authentication system, an authentication apparatus, an authentication target apparatus, an authentication method, a method of being authenticated, a program for realizing those on a computer, and a computer-readable information recording medium for recording the program.

Particularly, the present invention relates to an authentication system, an authentication apparatus, an authentication target apparatus, an authentication method, and a method of being authenticated which are suitable for authenticating an authentication target apparatus by comparing a position of the authentication target apparatus estimated by observing a radio wave from a common radio star at a common observation time, with the real position of the authentication target apparatus, and a program for realizing those, and a computer-readable information recording medium for storing this program.

2. Description of the Related Art

Conventionally, in the field of information communication technologies, authentication techniques for confirming who is the message creator or message sender have been researched. Nowadays, signature authentication systems and encryption communication systems using public key encryption are becoming widespread.

In the meantime, attempts have been made to receive radio waves radiated from radio stars such as quasars, and maser radio sources (including water maser radio source, ammonia maser radio source, and methanol maser radio source) using a VLBI (Very Long Baseline Interferometry) and utilize the received radio waves in various technical fields. There are advantages that signals received by a VLBI have ideal complete randomness, and that radio waves from radio stars can be received at every point on the earth (note that radio waves from some kinds of radio stars can be received at every point as long as the point exists on a surface facing toward the radio stars).

Therefore, techniques using a VLBI for measuring a relative positional relation between a point and another point on the earth are gradually put into practical use.

However, in the field of information communication technologies, a more secure authentication technique that can prevent "pretending" is required. Especially, in today's situation where information are exchanged over the boarders so often, more security is required for secret information sent to the Japanese government and Japanese companies from overseas.

SUMMARY OF THE INVENTION

The present invention was made to solve the above problem. Therefore, it is an object of the present invention to provide an authentication system, an authentication apparatus, an authentication target apparatus, an authentication method, and a method of being authenticated which are suitable for authenticating an authentication target apparatus by comparing a position of the authentication target apparatus estimated by observing a radio wave from a common radio star at a common observation time, with the real position of the authentication target apparatus, a program for realizing those on a computer, and a computer-readable information recording medium for storing this program.

To achieve the above object, the following invention is disclosed in accordance with the principle of the present invention.

An authentication system according to a first embodiment of the present invention is an authentication system which comprises an authentication apparatus and an authentication target apparatus both of which observe a radio wave from a common radio star at a common observation time. The authentication system works as follows.

The authentication apparatus observes a radio wave from the common radio star at the common observation time.

On the other hand, authentication target apparatus observes a radio wave from the common radio star at the common observation time, and sends an information message including information on the observed radio wave to the authentication apparatus.

Further, the authentication apparatus receives the information message sent from the authentication target apparatus, estimates a position of the authentication target apparatus with respect to the authentication apparatus, based on "'the information on the radio wave observed by the authentication target apparatus' included in the received information message" and "information on the radio wave observed by the authentication apparatus", and settles authentication for the information message as a success in a case where a position of the authentication target apparatus which is retained in the authentication apparatus in advance and the estimated position of the authentication target apparatus correspond to each other within a predetermined error range.

In the authentication system according to the present invention, "the common observation time and/or the common radio star" may be designated by a preparation message which is to be sent from the authentication apparatus to the authentication target apparatus in advance.

In the authentication system according to the present invention, "the common observation time and/or the common radio star" may be designated by a preparation message which is to be sent from the authentication target apparatus to the authentication apparatus in advance.

In the authentication system according to the present invention, number of the common radio star may be equal to or greater than 2.

In the authentication system according to the present invention, the common radio star may be a maser radio source (including a water maser radio source, ammonia maser radio source, and methanol maser radio source), or a quasar.

In the authentication system according to the present invention, in a case where the authentication for the information message is settled as a success, the authentication apparatus and the authentication target apparatus may perform encryption communication using an encryption key which is designated in the information message.

In the authentication system according to the present invention, in a case where the authentication for the information message is settled as a success, the authentication apparatus and the authentication target apparatus may perform encryption communication using a common key which is selected in advance in association with the authentication apparatus and the authentication target apparatus.

In the authentication system according to the present invention, in a case where the authentication for the information message is settled as a success, the authentication apparatus and the authentication target apparatus may perform encryption communication using a common key which is generated from a public key shared between them, a secret key owned by the authentication apparatus, and a secret key owned by the authentication target apparatus.

In the authentication system according to the present invention, the public key shared between the authentication apparatus and the authentication target apparatus may be generated from "information on a radio wave observed by the authentication target apparatus".

An authentication apparatus according to another aspect of the present invention is the authentication apparatus included in the authentication system described above.

An authentication target apparatus according to another aspect of the present invention is the authentication target apparatus included in the authentication system described above.

An authentication method according to another aspect of the present invention is an authentication method of observing a radio wave from a radio star common to an authentication target apparatus at an observation time common to the authentication target apparatus, and comprises an observing step, an information receiving step, an estimating step, and a determining step.

In the observing step, a radio wave is observed from the common radio star at the common observation time.

In the information receiving step, an information message sent from the authentication target apparatus is received.

In the estimating step, a position of the authentication target apparatus is estimated based on "'information on a radio wave observed by the authentication target apparatus' included in the received information message" and "information on the radio wave observed in the observing step".

In the determining step, authentication for the information message is settled as a success, in a case where a position of the authentication target apparatus which is retained in advance and the estimated position of the authentication target apparatus correspond to each other within a predetermined error range.

The authentication method according to the present invention may further comprise a preparation sending step. In the preparation sending step, a preparation message for designating "the common observation time and/or the common radio star" may be sent to the authentication target apparatus in advance.

The authentication method according to the present invention may further comprise a preparation receiving step. In the preparation receiving step, a preparation message for designating "an observation time and/or a radio star" may be received.

On the other hand, in the observing step, a radio wave may be observed, in a case where the received preparation message designates an observation time, by regarding the designated observation time as the common observation time, and in a case where the received preparation message designates a radio star, by regarding the designated radio star as the common radio star.

The authentication method according to the present invention may further comprise an encryption communication performing step. In the encryption communication performing step, encryption communication may be performed with the authentication target apparatus using an encryption key which is designated in the information message, in a case where authentication for the information message is settled as a success.

The authentication method according to the present invention may further comprise an encryption communication performing step. In the encryption communication performing step, encryption communication may be performed with the authentication target apparatus using a common key which is selected in advance in association with the authentication target apparatus, in a case where authentication for the information message is settled as a success.

The authentication method according to the present invention may further comprise an encryption communication performing step. In the encryption communication performing step, encryption communication may be performed with the authentication target apparatus using a common key which is generated from a public key shared with the authentication target apparatus, a predetermined secret key, and a secret key owned by the authentication target apparatus, in a case where authentication for the information message is settled as a success.

The authentication method according to the present invention may further comprise a public key generating step. In the public key generating step, the public key shared with the authentication target apparatus may be generated from "information on a radio wave observed by the authentication target apparatus".

A method of being authenticated according to another aspect of the present invention is a method of being authenticated in which a radio wave is observed from a radio star common to an authentication apparatus at an observation time common to the authentication apparatus, and comprises an observing step and a sending step.

In the observing step, a radio wave is observed from the common radio star at the common observation time.

In the sending step, an information message including information on the observed radio wave is sent to the authentication apparatus.

The method of being authenticated according to the present invention may further comprise a preparation sending step. In the preparation sending step, a preparation message for designating "the common observation time and/or the common radio star" may be sent to the authentication apparatus in advance.

The method of being authenticated according to the present invention may further comprise a preparation receiving step. In the preparation receiving step, a preparation message for designating "an observation time and/or a radio star" may be received.

On the other hand, in the observing step, a radio wave may be observed, in a case where the received preparation message designates an observation time, by regarding the designated observation time as the common observation time, and in a case where the received preparation message designates a radio star, by regarding the designated radio star as the common radio star.

The method of being authenticated according to the present invention may further comprise an encryption communication performing step. In the encryption communication performing step, encryption communication may be performed with the authentication apparatus using an encryption key which is designated in the information message, in a case where the authentication apparatus settles authentication for the information message as a success.

The method of being authenticated according to the present invention may further comprise an encryption communication performing step. In the encryption communication performing step, encryption communication may be performed with the authentication apparatus using a common key which is selected in advance in association with the authentication apparatus, in a case where the authentication apparatus settles authentication for the information message as a success.

The method of being authenticated according to the present invention may further comprise an encryption communication performing step. In the encryption communication performing step, encryption communication may be performed with the authentication apparatus using a common key which is generated from a public key shared with the authentication apparatus, a secret key owned by the authentication apparatus, and a predetermined secret key, in a case where authentication for the information message is settled as a success.

The method of being authenticated according to the present invention may further comprise a public key generating step. In the public key generating step, the public key shared with the authentication apparatus may be generated from "information on the radio wave observed in the observing step".

A program according to another aspect of the present invention is for controlling a computer to serves as the authentication apparatus described above, and for controlling a computer to execute the authentication method described above.

A program according to another aspect of the present invention is for controlling a computer to serve as the authentication target apparatus described above, and for controlling a computer to execute the method of being authenticated described above.

A computer-readable information recording medium (including a compact disk, a flexible disk, a hard disk, a magneto-optical disk, a digital video disk, a magnetic tape, or a semiconductor memory) according to another aspect of the present invention stores each of the above described programs.

This information recording medium may be distributed or sold independently from a computer. Or, each of the above described programs itself may be distributed or sold via a computer communication network such as the Internet.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiment of the Invention

An embodiment of the present invention will now be explained below. The embodiment to be described below is for an explanatory purpose, and not for limiting the scope of the present invention. Accordingly, even if those skilled in the art can employ an embodiment where individual elements or all of the elements included in the embodiment to be described below are replaced with equivalents of those, such an embodiment is also regarded to be included in the scope of the present invention.

Figure 1:
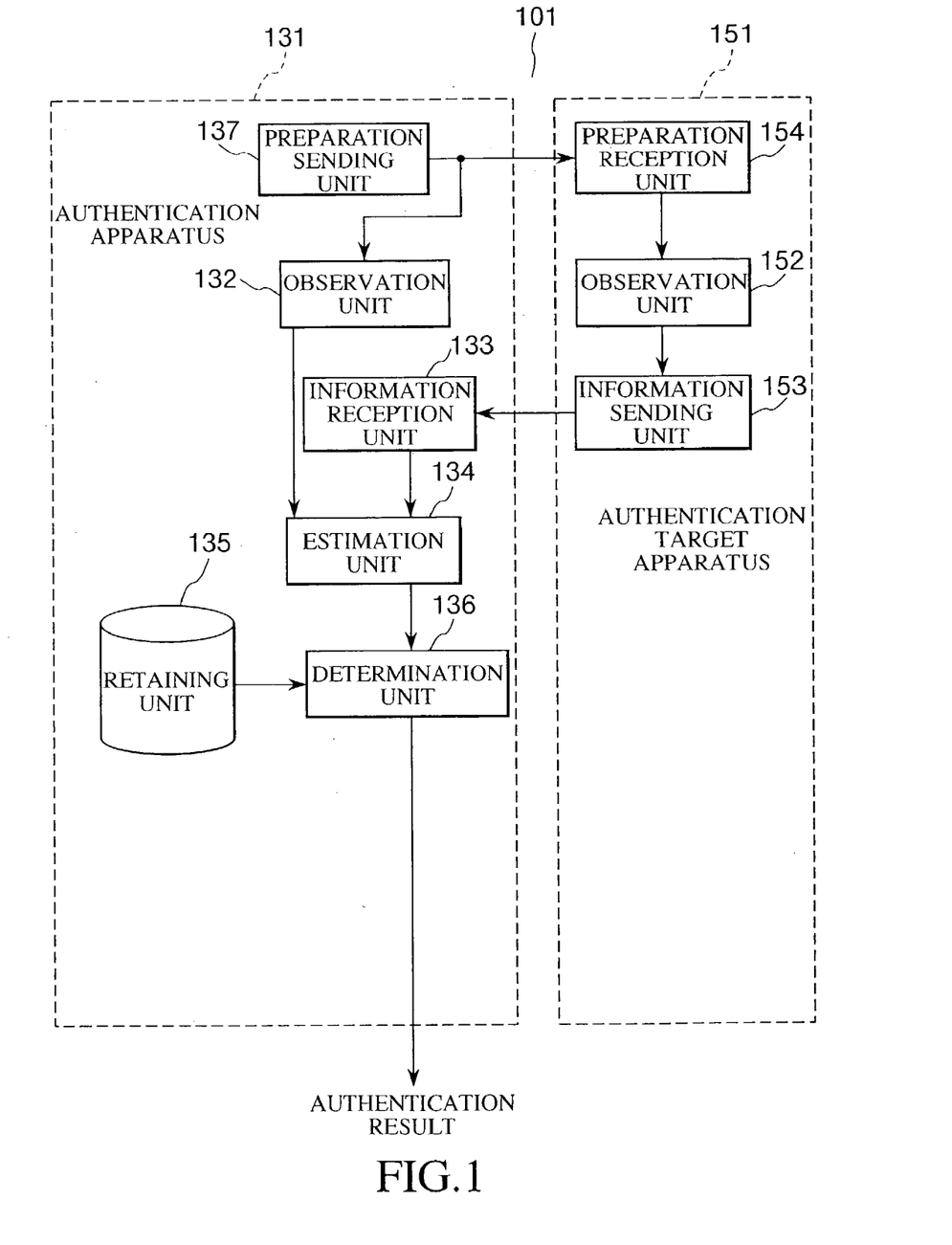
FIG. 1 is an exemplary diagram showing a schematic structure of an authentication system according to an embodiment of the present invention.
Figure 2:
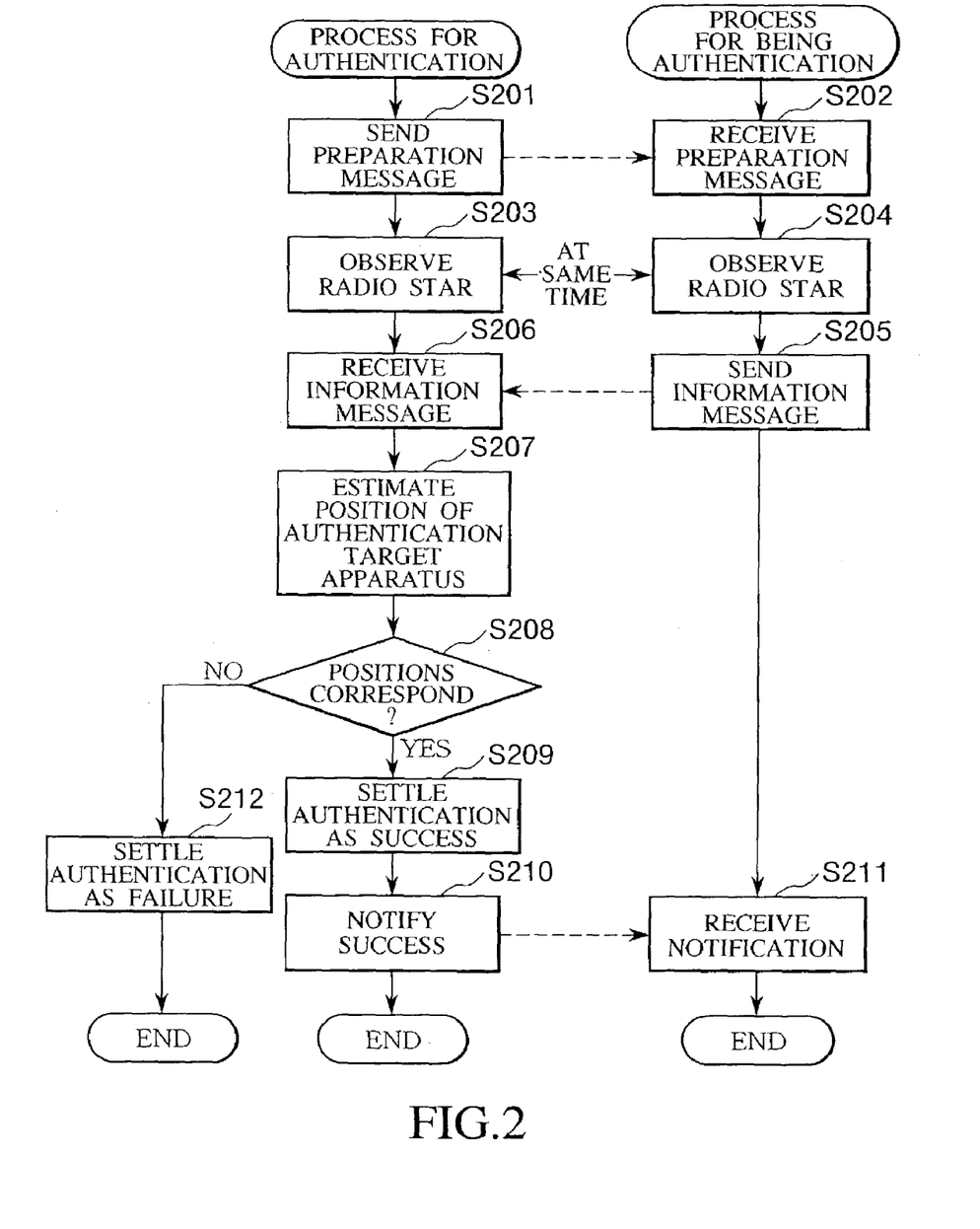
FIG. 2 is a flowchart showing the flow of a process for authenticating and a process for being authenticated, according to an embodiment of the present invention.

FIG. 1 is an exemplary diagram showing a schematic structure of an authentication system according to an embodiment of the present invention. FIG. 2 is a flowchart showing a process for authenticating and a process for being authenticated, which are to be performed in the authentication system shown in FIG. 1. The following explanation will be done with reference to those diagrams.

An authentication system 101 comprises an authentication apparatus 131 and an authentication target apparatus 151. The authentication apparatus 131 observes a radio wave from a radio star which is the same radio star whose radio wave the authentication target apparatus 151 observes, at the same time as the authentication target apparatus 151 observes it.

The authentication apparatus 131 comprises an observation unit 132, an information reception unit 133, an estimation unit 134, a retaining unit 135, a determination unit 136, and a preparation sending unit 137.

The authentication target apparatus 151 comprises an observation unit 152, an information sending unit 153, and a preparation reception unit 154.

First, the preparation sending unit 137 of the authentication apparatus 131 sends a preparation message for designating an observation time and a radio star, to the authentication target apparatus 151 (step S201).

The observation time needs to be such a time as behind the time of sending the preparation message, by a period of time which is required for getting the authentication apparatus 131 and the authentication target apparatus 151 ready for observation. However, it is preferable that the period of time which elapses from the message sending time is as short as possible.

As described above, a maser radio source (including a water maser radio source, ammonia maser radio source, and a methanol maser radio source), or a quasar can be designated as a radio star. The number of radio star which is to be designated is not limited to one, but may be plural.

On the other hand, the preparation reception unit 154 of the authentication target apparatus 151 receives the preparation message for designating an observation time and a radio star sent in step S201, from the authentication apparatus 131 (step S202).

The observation unit 132 of the authentication apparatus 131 observes a radio wave from the radio star designated in the preparation message, at the observation time designated in the preparation message (step S203).

And the observation unit 152 of the authentication target apparatus 151 observes a radio wave from the radio star designated in the preparation message, at the observation time designated in the preparation message (step S204).

The observation unit 132 of the authentication apparatus 131 and the observation unit 152 of the authentication target apparatus 151 refer to their respective reference clocks (not illustrated). Therefore, both can observe the radio star at the correct time.

Accordingly, the authentication apparatus 131 and the authentication target apparatus 151 observe a radio wave from the same radio star at the same observation time.

Then, the information sending unit 153 of the authentication target apparatus 151 sends an information message including information on the observed radio wave, to the authentication apparatus 131 (step S205).

The information reception unit 133 of the authentication apparatus 131 receives the information message sent from the authentication target apparatus 151 (step S206).

Then, the estimation unit 134 of the authentication apparatus 131 estimates the position of the authentication target apparatus 151 with respect to the authentication apparatus 131, based on the "information on the radio wave observed by the authentication target apparatus 151" which is included in the information message received in step S206, and based on information on the radio wave observed by the observation unit 132 of the authentication apparatus 131 itself (step S207).

Due to this, the authentication apparatus 131 can authenticate whether or not the information message was sent from a specific coordinate position on the earth (the position of the authentication target apparatus 151) at a specific time (the common observation time).

The retaining unit 135 retains in advance, positions of one or more authentication target apparatus(s) including the authentication target apparatus 151 which the authentication apparatus 131 is now authenticating.

The determination unit 136 determines whether the position of the authentication target apparatus 151 retained in advance in the retaining unit 135 and the position of the authentication target apparatus 151 estimated in step S207 correspond to each other within a predetermined error range (step S208).

In a case where both the positions correspond to each other (step S208; Yes), the authentication for the information message is settled as a success (step S209). Then, the authentication apparatus 131 notifies the authentication target apparatus 151 that the authentication results in success (step S210), and the authentication target apparatus 151 receives the notification that the authentication results in success (step S211).

Thus, the process for authenticating and the process for being authenticated are completed. Thereafter, the authentication apparatus 131 and the authentication target apparatus 151 can start post-authentication processes (for example, communication between them using encryption, to be described later).

On the other hand, in a case where both the positions do not correspond to each other (step S208; No), the authentication for the information message is settled as a failure (step S212). The authentication apparatus 131 notifies the authentication target apparatus that the authentication results in failure (not shown), and the authentication target apparatus 151 receives the notification that the authentication results in failure (not shown). Thus, the process for authenticating and the process for being authenticated are completed.

According to the present embodiment, authentication is performed by estimating the position of the authentication target apparatus 151 at a specific time, and comparing the estimated position with the already-known position of the authentication target apparatus 151.

It is possible to perform similar positional estimation using a radio wave from an artificial satellite for GPS (Global Positioning System). However, if the administrator of the artificial satellite has some freedom, he/she can forge or tamper with information on observation of a radio wave. On the other hand, according to the present embodiment, since a radio star which is a natural heavenly body is used, there is no possibility of forgery or tampering. Another difference from the GPS is that reception of signals is completely open and thus everyone can receive signals freely.

Further, if someone tries to do "pretending" in the present embodiment, he/she has to receive a radio wave from a radio star at the designated observation time, at the location where the authentication target apparatus 151 actually exists. However, movement higher than light velocity is impossible according to the principle of relativity. Accordingly, it is practically impossible for the pretender to receive a radio wave from a radio star at the observation time at the location where the authentication target apparatus 151 exists.

The principle of the position estimation technique using a VLBI will be explained below in more detail.

Method of Position Estimation

Figure 3:
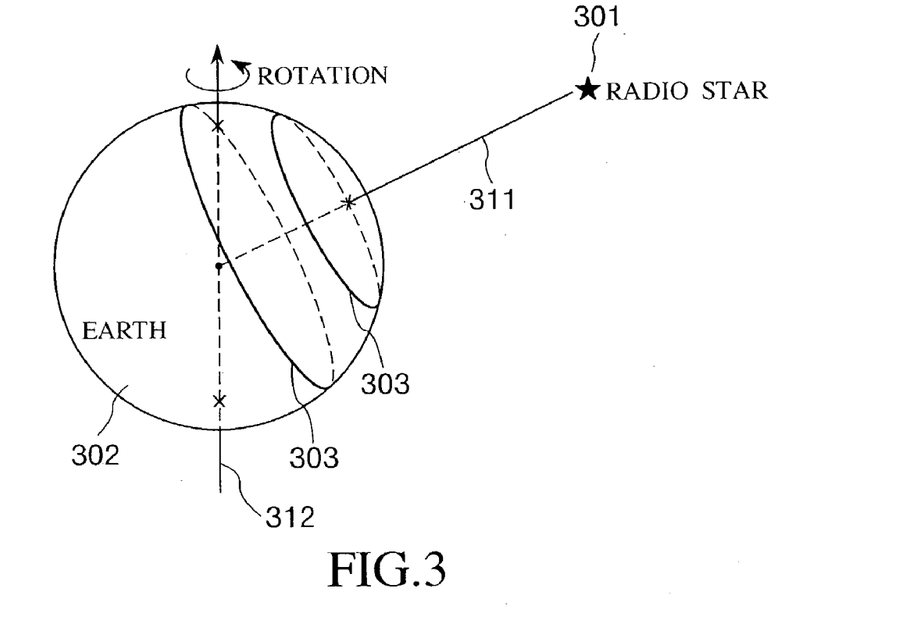
FIG. 3 is an explanatory diagram schematically showing common wavefront delay lines of a radio wave from a radio star.

FIG. 3 is an explanatory diagram schematically showing common wavefront delay lines of a radio wave from a radio star. The following explanation will be made with reference to this diagram on the assumption that the earth is a sphere.

A radio wave radiated from a radio star 301 propagates its wavefronts globularly from the radio star 301. Therefore, a common wavefront arrives at a same time at points existing on an intersection line 303 of "a plane perpendicular to 'a line 311 which joints the radio star 301 with the center of the earth 302'" and "the surface of the earth 302". Thus, this intersection line 303 is called common wavefront delay line. Common wavefront delay lines are arranged as concentric circles with their centers on the line 311.

Figure 4:
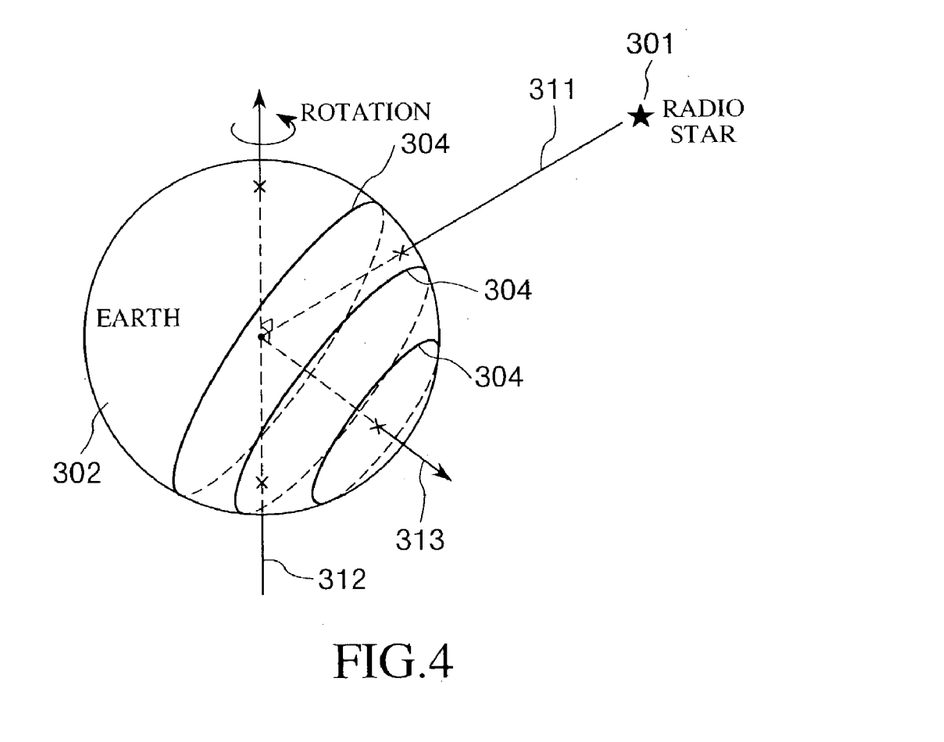
FIG. 4 is an explanatory diagram schematically showing common delay time ratio lines of a radio wave from a radio star.

FIG. 4 is an explanatory diagram schematically showing common delay time ratio lines of a radio wave from a radio star. The following explanation will be made with reference to this diagram.

The earth 302 rotates on its axis. Therefore, concentric circles each made of points having a common delay time ratio are arranged on an axis 313 perpendicular to a plane which is trailed by "a line 311 which joints the radio star 301 with the center of the earth 302" and "a polar axis 312 of the earth 302 (a line which joints the north pole and the south pole)". Each line 304 which joints those points having a common delay time ratio is called common delay time ratio line.

It is possible to obtain delay of the authentication target apparatus 151 with respect to the authentication apparatus 131 and the delay time ratio, by getting information obtained respectively by the authentication apparatus 131 and by the authentication target apparatus 151 from concurrent observation of a radio wave to interfere with each other, and applying fast Fourier transform to the result of the interference to find out its peak.

Specifically, the observation result obtained by the authentication apparatus 131 and the observation result obtained by the authentication target apparatus 151 are shifted with a time difference between them, and correlation between them is obtained. Then, two-dimensional fast Fourier transform in the direction of delay time axis and in the direction of delay time ratio axis is applied to the correlation between them obtained at each time difference.

Figure 5:
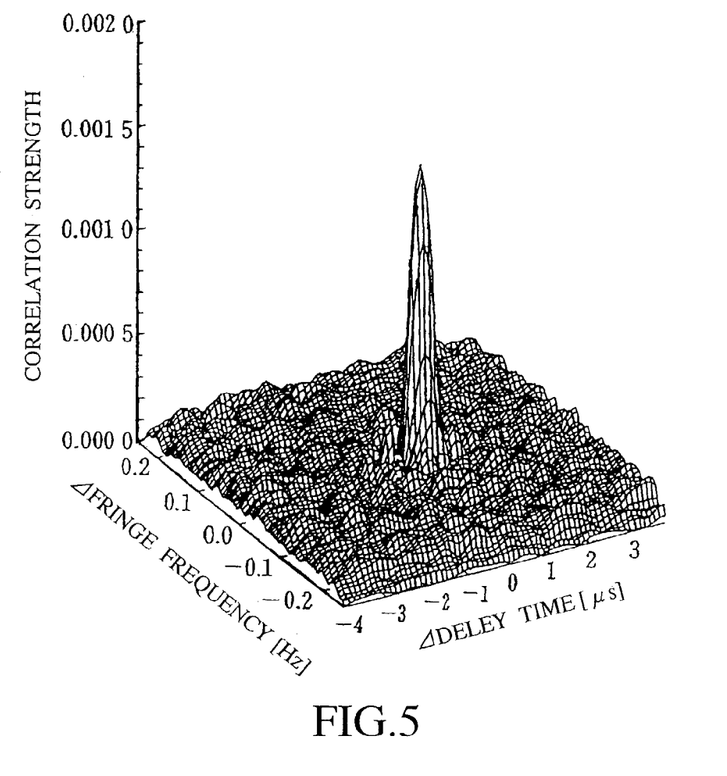
FIG. 5 is a diagram showing results of calculating two-dimensional fast Fourier transform whereby delay and delay time ratio can be obtained.

FIG. 5 shows results of calculating the two-dimensional fast Fourier transform in the direction of delay time and in the direction of delay time ratio. In FIG. 5, the axis of "Δ delay time" represents the delay time axis, and the axis of "Δ fringe frequency" represents the delay time ratio axis.

Figure 6:
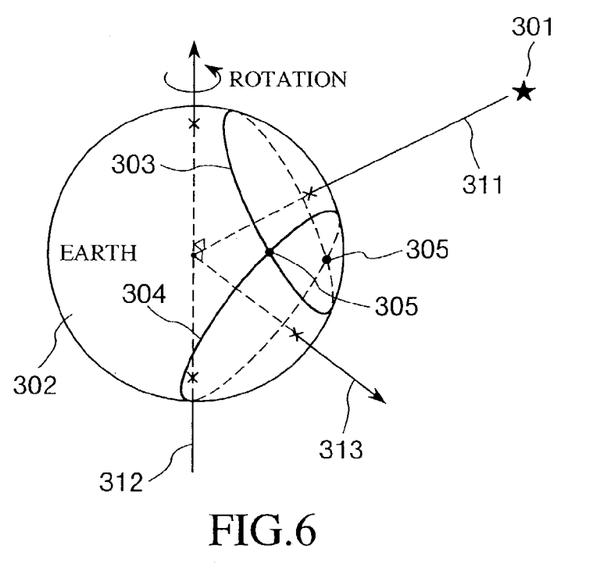
FIG. 6 is an explanatory diagram showing the relationship among a common wavefront delay line, a common delay time ratio line, and an estimated position.

As shown in FIG. 6, a common wavefront delay line 303 which is the intersection line of a wavefront and the surface of the earth corresponding to the obtained delay, and a common delay time ratio line 304 which is the intersection line of a wavefront and the surface of the earth corresponding to the obtained delay time ratio intersect with each other at points 305. Those intersection points 305 can be determined as the positions of the authentication target apparatus 151 on the surface of the earth. Such a method of estimating the position of the authentication target apparatus 151 is referred to as "wavefront synchronization method".

In general, the lines have two intersection points 305. Therefore, with reference to the position of the authentication target apparatus 151 which is retained in the retaining unit 135 of the authentication apparatus 131, the position indicated by one intersection point 305 that is more distant from the retained position should be ignored, and the position indicated by the other intersection point 305 that is nearer to the retained position should be employed as the estimation result.

If the position of the intersection point 305 obtained as above corresponds to the position of the authentication target apparatus 151 retrained in the retaining unit 135 within a predetermined error range, the radio wave information sent from the authentication target apparatus 151 can be authenticated as having been obtained from observation made at the designated observation time at the position where the authentication target apparatus 151 exists.

In the above explanation, it has been assumed that there is only one radio star. However, if a plurality of radio stars are utilized, the position of the authentication target apparatus 151 can be estimated more accurately and precisely.

In a case where only a discrete radio source such as a quasar is used, it is possible to forge radio wave observation information which seems to be obtained at the right position of the authentication target apparatus 151, using radio wave observation information obtained at another position, by getting information on a radio star and observation time in advance and manipulating the reference clock with high skills. Accordingly, "pretending" can not be prevented completely.

However, by using a maser radio source having a complicated structure (such as a double-eyed structure, etc.) or by using a plurality of radio stars existing closely to each other in the celestial sphere, such "pretending" can be counteracted. In a case where there are a plurality of radio sources in the same direction when seen from the center of the earth 302, it is impossible to forge phase shift even by manipulating the reference clock, unlike the case of a discrete radio source where there is only one radio source. Therefore, it is impossible to forge radio wave observation information which seems to be obtained at the position of the authentication target apparatus 151 using radio wave observation information obtained at another position.

According to the present embodiment, a more secure Space-Time Coordinate Authorization technique than conventional ones can be realized.

Another Embodiment

In the above described embodiment, the authentication apparatus 131 gives designation of an observation time and a radio star to the authentication target apparatus 151. Contrarily, the authentication target apparatus 151 may give designation of an observation time and a radio star to the authentication apparatus 131. In this case, the preparation sending unit 137 should be installed in the authentication target apparatus 151, and the preparation reception unit 154 should be installed in the authentication apparatus 131.

Other than the above, an embodiment where the authentication apparatus 131 designates a radio star and the authentication target apparatus 151 designates an observation time, and an embodiment reverse to this may be employable.

Another Embodiment

Figure 7:
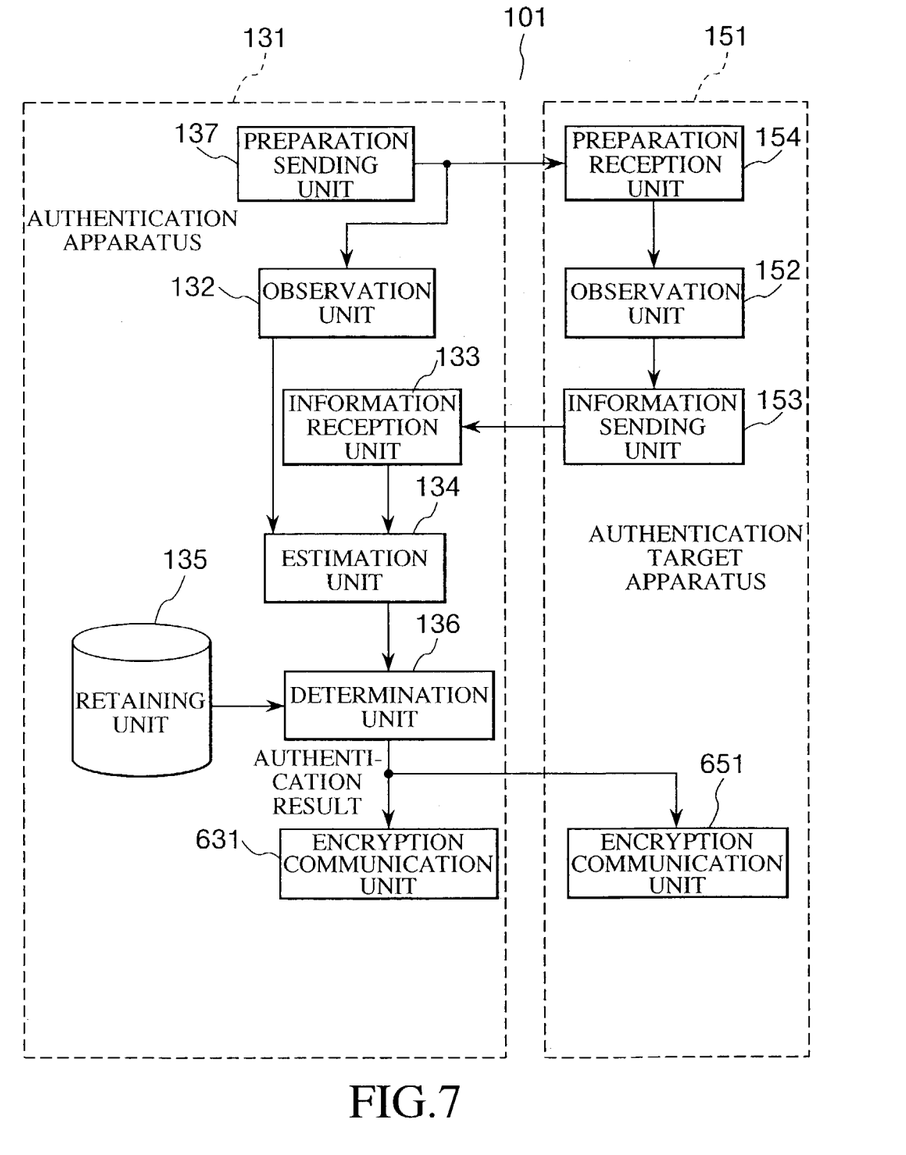
FIG. 7 is an exemplary diagram showing a schematic structure of an authentication system according to another embodiment of the present invention.

FIG. 7 is an exemplary diagram showing a schematic structure of an authentication system according to another embodiment of the present invention. The following explanation will be made with reference to this diagram. The present embodiment will explain how to perform data communication using an encryption technique, after authentication ends up in success in the authentication system of the above described embodiments.

The authentication apparatus 131 and the authentication target apparatus 151 of the authentication system 101 according to the present embodiment comprise an encryption communication unit 631 and an encryption communication unit 651 respectively, in addition to elements same as those in the above embodiments.

After authentication results in success, the encryption communication unit 631 of the authentication apparatus 131 and the encryption communication unit 651 of the authentication target apparatus 151 can perform encryption communication according to the methods as below.

(1) First Method

The authentication target apparatus 151 includes encryption key information to be used for encryption communication in the information message, in addition to the information on the observed radio wave. The authentication apparatus 131 and the authentication target apparatus 151 perform encryption communication using this encryption key.

(2) Second Method

The authentication apparatus 131 and the authentication target apparatus 151 together select a common key in advance between them secretly. The authentication apparatus 131 and the authentication target apparatus 151 perform encryption communication using this common encryption key.

(3) Third Method

In this method, a secret key A owned by the authentication apparatus 131, a secret key B owned by the authentication target apparatus 151, and a public key C obtained in accordance with some kind of method, are used. For example, since radio wave information obtained as a result of observing a radio star has an excellent characteristic as a random number, radio wave information obtained by the authentication apparatus 151 from observation of a radio star can be used as the public key C.

Now, an operation f which satisfies the following characteristic will be considered.

$$f(B, f(A, C)) = f(A, f(B, C)) = Z$$

Such an operation as this that has commutativity is widely known in the field of public key distribution techniques.

The authentication apparatus 131 calculates f(A, C), and sends it to the authentication target apparatus 151. The authentication target apparatus 151 calculates f(B, f(A, C))=Z using the received f(A, C) and B, thereby to obtain a common key Z.

On the other hand, the authentication target apparatus 151 calculates f(B, C), and sends it to the authentication apparatus 131. The authentication apparatus 131 calculates f(A, f(B, C))=Z using the receives f(B, C) and A, thereby to obtain the common key Z.

In this way, the authentication apparatus 131 and the authentication target apparatus 151 can share the common key Z. Therefore, in encryption communication, if a message to be transmitted is encrypted using the common key Z, both the authentication apparatus 131 and the authentication target apparatus 151 can decrypt the message.

As an operation f having such a characteristic, $f(x, y)=y^x$ mod p (x, y, and p are positive integers) can be considered.

As explained above, according to the present invention, it is possible to provide an authentication system, an authentication apparatus, an authentication target apparatus, an authentication method, and a method of being authenticated which are suitable for authenticating an authentication target apparatus by comparing a position of the authentication target apparatus estimated by observing a radio wave from a common radio star at a common observation time, with the real position of the authentication target apparatus, a program for realizing those, and a computer-readable information recording medium for storing this program.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-18810 filed on Jan. 28, 2002 and including specification, claims, drawings and summary. The disclosure of the above Japanese Patent Application is incorporated herein by reference in its entirety.

What is claimed is:

1. An authentication system comprising an authentication apparatus and an authentication target apparatus both of which observe a radio wave from a common radio star at a common observation time,
wherein:
(a) said authentication apparatus observes a radio wave from the common radio star at the common observation time;
(b) said authentication target apparatus
observes a radio wave from the common radio star at the common observation time, and
sends an information message including information on the observed radio wave to said authentication apparatus; and
(c) said authentication apparatus
receives the information message sent from said authentication target apparatus,
applies two-dimensional fast Fourier transform in the direction of delay time axis and in the direction of delay time ratio axis to the information on the radio wave observed by said authentication target apparatus included in the received information message and information on the radio wave observed by said authentication apparatus at each time difference,
estimates two intersection positions of a common wavefront delay line and a common delay time ratio line on the earth, from the peak of the result of the two-dimensional fast Fourier transform, and
settles authentication for the information message as a success in a case where a position of said authentication target apparatus which is retained in said authentication apparatus in advance and one of the estimated two intersection positions correspond to each other within a predetermined error range.

2. The authentication system according to claim 1, wherein the common observation time and/or the common radio star is/are designated by a preparation message which is to be sent from said authentication apparatus to said authentication target apparatus in advance.

3. The authentication system according to claim 1, wherein the common observation time and/or the common radio star is/are designated by a preparation message which is to be sent from said authentication target apparatus to said authentication apparatus in advance.

4. The authentication system according to claim 1, wherein number of the common radio star is equal to or greater than 2.

5. The authentication system according to claim 1, wherein the common radio star is a maser radio source including a water maser radio source, ammonia maser radio source, and methanol maser radio source, or a quasar.

6. The authentication system according to claim 1, wherein in a case where the authentication for the information message is settled as a success, said authentication apparatus and said authentication target apparatus perform encryption communication using an encryption key which is designated in the information message.

7. The authentication system according to claim 1, wherein in a case where the authentication for the information message is settled as a success, said authentication apparatus and said authentication target apparatus perform encryption communication using a common key which is selected in advance in association with said authentication apparatus and said authentication target apparatus.

8. The authentication system according to claim 1, wherein in a case where the authentication for the information message is settled as a success, said authentication apparatus and said authentication target apparatus perform encryption communication using a common key which is generated from a public key shared between them, a secret key owned by said authentication apparatus, and a secret key owned by said authentication target apparatus.

9. The authentication system according to claim 8, wherein the public key shared between said authentication apparatus and said authentication target apparatus is generated from information on a radio wave observed by said authentication target apparatus.

10. An authentication apparatus which observes a radio wave from a radio star common to an authentication target apparatus at an observation time common to said authentication target apparatus, comprising:

an observation unit which observes a radio wave from the common radio star at the common observation time;

an information reception unit which receives information message sent from said authentication target apparatus;

an estimation unit which applies two-dimensional fast Fourier transform in the direction of delay time axis and in the direction of delay time ratio axis to the information on the radio wave observed by said authentication target apparatus included in the received information message and information on the radio wave observed by said authentication apparatus at each time difference, and estimates two intersection positions of a common wavefront delay line and a common delay time ratio line on the earth, from the peak of the result of the two-dimensional fast Fourier transform;

a retaining unit which retains position(s) of one or more authentication target apparatus(s) in advance; and a determination unit which settles authentication for the information message as a success, in a case where a position of said authentication target apparatus retained in said retaining unit in advance and one of the estimated two intersection positions correspond to each other within a predetermined error range.

11. The authentication apparatus according to claim 10, further comprising a preparation sending unit which sends a preparation message for designating the common observation time and/or the common radio star to said authentication target apparatus in advance.

12. The authentication apparatus according to claim 10, further comprising a preparation reception unit which receives a preparation message for designating an observation time and/or a radio star, wherein said observation unit observes a radio wave, in a case where the received preparation message designates an observation time, by regarding the designated observation time as the common observation time, and in a case where the received preparation message designates a radio star, by regarding the designated radio star as the common radio star.

13. The authentication apparatus according to claim 10, further comprising an encryption communication unit which performs encryption communication with said authentication target apparatus using an encryption key which is designated in the information message, in a case where said determination unit settles the authentication for the information message as a success.

14. The authentication apparatus according to claim 10, further comprising an encryption communication unit which performs encryption communication with said authentication target apparatus using a common key which is selected in advance in association with said authentication target apparatus, in a case where the authentication for the information message is settled as a success.

15. The authentication apparatus according to claim 10, further comprising an encryption communication unit which performs encryption communication with said authentication target apparatus using a common key which is generated from a public key shared with said authentication target apparatus, a secret key owned by said authentication apparatus, and a secret key owned by said authentication target apparatus.

16. The authentication apparatus according to claim 15, further comprising a public key generation unit which generates the public key shared with said authentication target apparatus, from information on a radio wave observed by said authentication target apparatus.

17. A program product for controlling a computer to serve as said authentication apparatus set forth in claim 10.

18. An authentication method of observing a radio wave from a radio star common to an authentication target apparatus at an observation time common to said authentication target apparatus, said method comprising:

an observing step of observing a radio wave from the common radio star at the common observation time;

an information receiving step of receiving an information message sent from said authentication target apparatus;

an estimating step of applying two-dimensional fast Fourier transform in the direction of delay time axis and in the direction of delay time ratio axis to the information on the radio wave observed by said authentication target apparatus included in the received information message and information on the radio wave observed by said authentication apparatus at each time difference, and estimating two intersection positions of a common wavefront delay line and a common delay time ratio line on the earth, from the peak of the result of the two-dimensional fast Fourier transform; and a determining step of settling authentication for the information message as a success, in a case where a position of said authentication target apparatus which is retained in advance and one of the estimated two intersection positions correspond to each other within a predetermined error range.

19. The authentication method according to claim 18, further comprising a preparation sending step of sending a preparation message for designating the common observation time and/or the common radio star to said authentication target apparatus in advance.

20. The authentication method according to claim 18, further comprising a preparation receiving step of receiving a preparation message for designating an observation time and/or a radio star, wherein in said observing step, a radio wave is observed, in a case where the received preparation message designates an observation time, by regarding the designated observation time as the common observation time, and in a case where the received preparation message designates a radio star, by regarding the designated radio star as the common radio star.

21. The authentication method according to claim 18, further comprising an encryption communication performing step of performing encryption communication with said authentication target apparatus using an encryption key which is designated in the information message, in a case where authentication for the information message is settled as a success.

22. The authentication method according to claim 18, further comprising an encryption communication performing step of performing encryption communication with said authentication target apparatus using a common key which is selected in advance in association with said authentication target apparatus, in a case where authentication for the information message is settled as a success.

23. The authentication method according to claim 18, further comprising an encryption communication perform ing step of performing encryption communication with said authentication target apparatus using a common key which is generated from a public key shared with said authentication target apparatus, a predetermined secret key, and a secret key owned by said authentication target apparatus, in a case where authentication for the information message is settled as a success.

24. The authentication method according to claim 23, further comprising a public key generating step of generating the public key shared with said authentication target apparatus from information on a radio wave observed by said authentication target apparatus.

* * * * *